(12) United States Patent
Ebrahimi Afrouzi et al.

(10) Patent No.: US 10,800,038 B1
(45) Date of Patent: Oct. 13, 2020

(54) SYSTEM AND METHOD FOR CONFINEMENT OF A ROBOTIC DEVICE

(71) Applicant: Bobsweep Inc., Toronto (CA)

(72) Inventors: Ali Ebrahimi Afrouzi, San Jose, CA (US); Masih Ebrahimi Afrouzi, Las Vegas, NV (US); Soroush Mehrnia, Copenhagen (DK)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 15/676,902

(22) Filed: Aug. 14, 2017

Related U.S. Application Data

(63) Continuation of application No. 14/673,656, filed on Mar. 30, 2015, now Pat. No. 9,764,473.

(60) Provisional application No. 61/992,406, filed on May 13, 2014.

(51) Int. Cl.
*B25J 9/16* (2006.01)

(52) U.S. Cl.
CPC ............ *B25J 9/1666* (2013.01); *Y10S 901/01* (2013.01); *Y10S 901/49* (2013.01)

(58) Field of Classification Search
CPC ... B25J 9/1666; G05D 1/0234; G05D 1/0238; G01S 1/725; Y01S 901/01
See application file for complete search history.

(56) References Cited

U.S. PATENT DOCUMENTS

| | | | | |
|---|---|---|---|---|
| 5,491,670 A | * | 2/1996 | Weber | G01S 5/30 367/127 |
| 2004/0111184 A1 | * | 6/2004 | Chiappetta | G05D 1/0242 700/245 |
| 2006/0259194 A1 | * | 11/2006 | Chiu | G01S 1/725 700/245 |
| 2007/0244610 A1 | * | 10/2007 | Ozick | A47L 5/30 701/23 |
| 2007/0250212 A1 | * | 10/2007 | Halloran | A47L 5/30 700/245 |
| 2010/0222926 A1 | * | 9/2010 | Chiu | G01S 1/725 700/253 |
| 2012/0259465 A1 | * | 10/2012 | Chen | G01S 17/87 700/259 |
| 2014/0204715 A1 | * | 7/2014 | Napolitano | G01S 1/763 367/125 |

\* cited by examiner

*Primary Examiner* — Dale Moyer

(57) ABSTRACT

The disclosure relates to a system and/or method to create or otherwise define one or more virtual barriers for confining or controlling an autonomous robotic device substantially within one or more portion of one or more selected working areas, for example, to prohibit entrance of certain areas. The system and/or method may use a set of beacon transmitters that emit time-stamped signals, which are received by one or more robots and used to calculate the robotic device's distance from such beacons.

13 Claims, 8 Drawing Sheets

SYSTEM AND METHOD FOR CONFINEMENT OF A ROBOTIC DEVICE

FIELD OF THE INVENTION

This disclosure relates to robotic systems generally, and more particularly to guidance and/or confinement of robotic devices.

BACKGROUND OF THE INVENTION

Robotic devices may operate within a confined portion of a physical area or workspace. Mobile robots may perform routine tasks, such as vacuuming, sweeping, mopping, cutting grass, etc., without moving into certain areas specified by the user. However, on occasion, a vacuuming robot operating within a first area may be permitted to travel into a second area prior to satisfactory completion of, for example, a vacuuming task within the first area. In other instances, the vacuuming robot may collide with and, potentially, damage a fragile or unstable object that is not detected by sensors accessed by the vacuuming robot. In other instances, a user may simply prefer that a vacuuming robot remain outside of an area, for example, if the area is currently in use. Thus, it may be useful to confine a robotic device so as to operate within certain areas and to prevent unwanted transition between areas.

One approach toward confining robotic device may be to utilize physical barriers that block the robotic device from entering, or becoming proximate with, one or more objects and/or areas of operation. However, this solution is neither efficient nor practical since substantial extra equipment (e.g., barriers and/or other objects) may encumber routine movement through the area of operation by the robotic device. Further, such an approach may involve an undesirable degree of human intervention, which may decrease a level of autonomy of the system as a whole.

SUMMARY OF THE INVENTION

Embodiments of claimed subject matter may be directed to devices, systems, and/or methods for robot confinement. Advantageously, certain embodiments may acquire, at the robotic device, one or more time-stamped signals transmitted by a beacon; and generate, using the acquired one or more time-stamped signals, a measure of distance of the robotic device from the beacon, the one or more processors generating, according to the measure of distance, a virtual barrier to restrict movement of the robotic device relative to the virtual barrier.

In one or more embodiments, the one or more processors executes computer-implemented instructions are additionally to bring about the robotic device to restrict or modify a movement path of the robotic device in response to approaching the virtual barrier. In one or more embodiments, a robotic device may synchronize at least one clock of the robotic device with a clock of the beacon, the transmitted one or more signals being time-stamped by the beacon using the clock of the beacon. In one or more embodiments, the one or more processors may determine distance between the robotic device and the beacon by computing, via the one or more processors, one or more values of elapsed time between a transmission time of one or more time-stamped signals transmitted by the beacon and a time at which the one or more time-stamped signals were acquired at the robotic device. In one or more embodiments, a robotic device may move in a direction away from one or more points estimated, at least in part, by computing one or more values of elapsed time. In one or more embodiments, one or more values of elapsed time may correspond to an estimated distance between the robotic device and the beacon, in which the estimated distance may be user-adjustable.

In one or more embodiments, a controller may be utilized to control movement of the robotic device to operate within a maximum distance, the maximum distance corresponding, at least in part, to the one or more values of elapsed time. One or more embodiments may include receiving an adjustment, from a user interface, of the maximum distance between the robotic device and a beacon. One or more embodiments may include restricting movement of the robotic device so as to avoid collision with the beacon based, at least in part, on one or more predefined minimum values of elapsed time between a transmission time of one or more time-stamped signals transmitted by the beacon and a time at which the one or more time-stamped signals were acquired at the robotic device. In one or more embodiments, the beacon may transmit electromagnetic signals having carrier frequencies that differ from one another.

In one or more embodiments, responsive to detecting a plurality of the signals having carrier frequencies that differ from one another, the robotic device may compare a computed value of elapsed time, between a transmission time of one or more time-stamped signals transmitted by the beacon and a time at which the one or more time-stamped signals were acquired at the robotic device, for corresponding ones of signals having carrier frequencies so as to compute a difference value between calculated elapsed time for the corresponding ones of signals having carrier frequencies, the one or more processors configuring, responsive to the comparing, the robotic device to avoid traversing a horizontal line, the horizontal line determined, at least in part, by utilizing the computed value of elapsed time of the ones of the signals having different carrier frequencies. In one or more embodiments, movement of a robotic device may be restrictively enabled to move within a circular virtual barrier, a linear virtual barrier, or any combination thereof based, at least in part, on omni-directional transmission of signals of different frequencies. In one or more embodiments, acquiring of a signal by the robotic device may comprise acquiring a radio frequency signal, a laser signal, an infrared signal, or any combination thereof. In one or more embodiments, a sonar signal, transmitted by a beacon, may be acquired by the robotic device.

BRIEF DESCRIPTION OF DRAWINGS

Non-limiting and non-exhaustive features of the present invention are described with reference to the following figures, wherein like reference numerals refer to like parts throughout the various figures.

DETAILED DESCRIPTION

Figure 1:
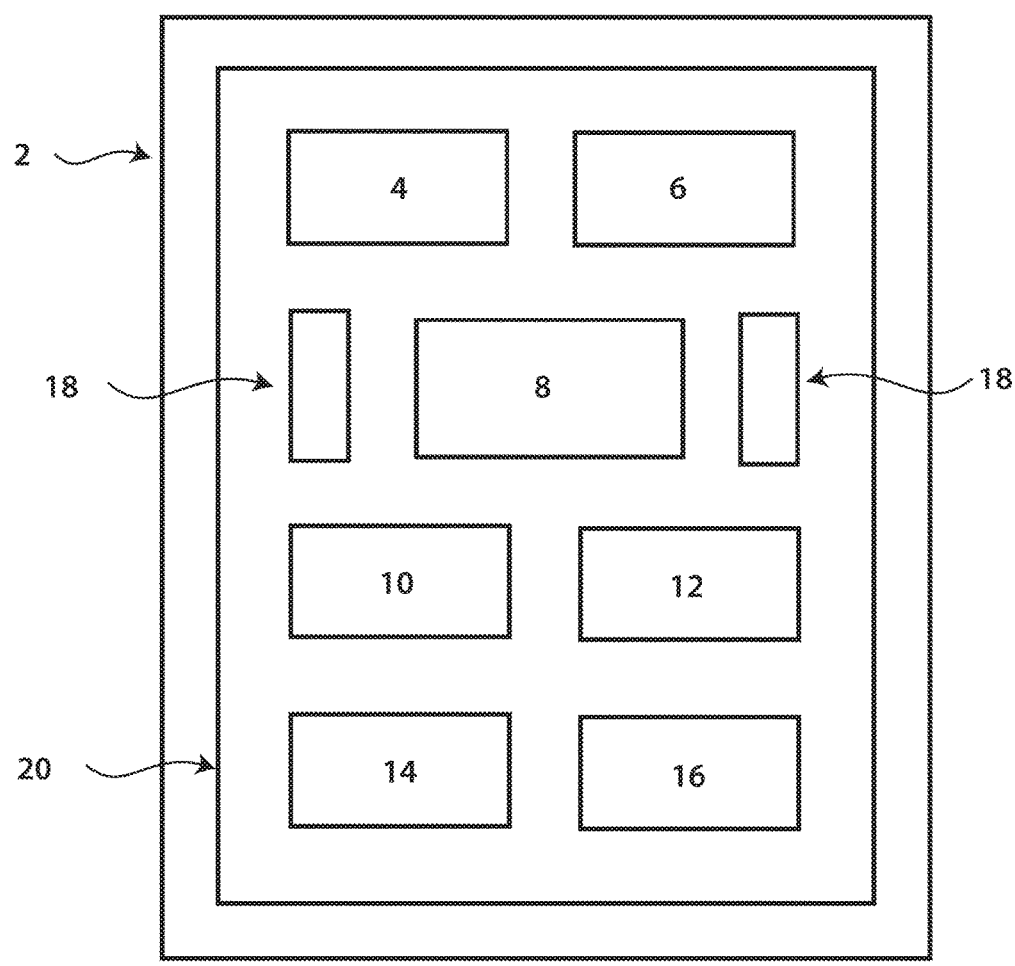
FIG. 1 illustrates an example of a robotic device as used herein.

The disclosure described herein is directed generally to one or more processor-automated methods and/or systems that generate one or more virtual barriers for restricting or permitting autonomous robotic device movement within or out of a working area. For example, an embodiment contemplates that a robotic device may receive one or more time-stamped signals transmitted by one or more beacon transmitters, generated by a processor or controller, using the received one or more time-stamped signals, to determine a distance of a robotic device from the one or more beacon transmitters. Accordingly, the processor or controller may create, according to the determined distance, one or more virtual barriers, thereby restricting or permitting movement of the robotic device relative to such virtual barrier(s.)

Embodiments may introduce a system and/or method to provide at least three types of virtual barriers for autonomous robots using wireless beacons.

In an embodiment, a processor or controller may execute one or more software applications and may access one or more local or networked databases to bring about robotic device movement to restrict, permit, or otherwise change movement of a robotic device responsive to creation of a virtual barrier.

As understood herein, the term "robot" or "robotic device" may be defined generally to include one or more autonomous devices having communication, mobility, and/or processing elements. For example, a robot or robotic device may comprise a casing or shell, a chassis including a set of wheels, a motor to drive wheels, a receiver that acquires signals transmitted from, for example, a transmitting beacon, a processor, and/or controller that processes and/or controls motor and other robotic autonomous or cleaning operations, network or wireless communications, power management, etc., and one or more clock or synchronizing devices.

Preferably one or more beacon transmitters are provided to be portable and self-powered. Furthermore, one or more clocks or other synchronizing devices may synchronize or otherwise functionally coordinate with one or more internal or external clocks accessible to one or more beacon transmitters, such that transmitted signals may be time-stamped via a beacon transmitter using clock signals.

Moreover, when operating according to one embodiment, a processor or controller may calculate one or more distances between a robot and a beacon transmitter, for example, by measuring elapsed times ($\Delta t$) between when time-stamped signals are transmitted and/or time-stamped by the beacon transmitter and when corresponding signals are received by a robot. The beacon transmitter may transmit time-stamped signals omni-directionally to cover an area around the circumference of the beacon transmitter.

Thus, generally the processor or controller may bring about robotic device movement away from (or towards) locations associated with calculated time-elapsed values, such as predefined minimum or maximum $\Delta t$, depending, at least in part, on whether robotic movement restriction or permission is desired. In embodiments, minimum or maximum $\Delta t$ or determined distance between particular robots and particular beacon transmitters may be pre-set, user-adjustable, and otherwise electronically communicated using a network, and/or deleted between a beacon transmitter and a robotic device, for example, during activation, operation or user adjustment of certain beacon transmitters and/or robotic device. It is contemplated generally herein that a processor or controller may program or otherwise control certain robotic device movement by restricting or permitting a robotic device operationally from moving into various area(s) associated with point locations calculated by the processor or controller according to the calculated elapsed times $\Delta t$, as well as any predefined maximum or minimum values $\Delta t$.

Hence, in one automated robotic control embodiment, autonomous robotic device movement may be restricted or permitted programmably to operate within a preset, calculated, or otherwise desired distance from one or more cooperating beacon transmitters. For example, predefined maximum $\Delta t$ or determined distance between a particular robotic device and corresponding beacon transmitter may be user-adjustable, and communicated between such beacon transmitter and robotic device during activation, operation, or user adjustment of such beacon transmitter. Accordingly, a predefined minimum $\Delta t$ may prevent the robotic device from effectively colliding with such beacon transmitter.

In one or more embodiments, at least one beacon transmitter may include a plurality of emitters that wirelessly transmit various beacon signals, for instance, having carrier frequencies that differ from one another. By detecting such varying emitted signals, a particular robotic device may compare a computed elapsed time $\Delta t$ for each varying signal, and may thereby calculate a time difference between calculated elapsed time $\Delta t$ for each varying signal, such that the processor or controller may program or otherwise configure a particular robotic device to prohibit or permit the particular robotic device for moveable operation to cross or traverse a virtual line. A difference in calculated elapsed time, (e.g., $\Delta t$) of variant signals may be determined by the processor or controller to be substantially 0.0 seconds, for example.

Alternatively, in one embodiment, a beacon transmitter may include a plurality of emitters that transmit, substantially omni-directionally, signals having different carrier or signal frequencies, which may thereby operate to restrictively enable or permit robotic device movement within circular and/or linear virtual barrier(s,) for example, according to user selection that enables restrictive robotic device movement according to circular and/or linear virtual barrier (s.) Transmitted beacon signals may be provided and detected as sonar, radio-frequency, laser, infrared, or other wireless signal.

FIG. 1 illustrates a device 1 embodying features and/or having the type and functionality of a sample representative robotic device, for example, having casing or shell 2, a chassis 20, a set of wheels 18, a motor 14 to drive wheels, a receptor 16 that detects transmitted signals, a processor 4 and/or controller 6 to process and/or control motor and other robotic autonomous or cleaning operations, network or wireless communications, power management, etc., and one or more clock or synchronizing devices 12. Device 1 may additionally comprise local digital memory or accessible storage unit 8, a wireless sonar/radio sensor and/or telecommunications transceiver 10 for mobile communication interface with a network or other wireless communication device, or beacon transmitters, for example.

It is contemplated that one or more beacon signals may be provided herein utilizing a method and/or system using omni-directional signaling, to create or otherwise cover a working area that is effectively off-limits from robotic device operational movement. Hence such restrictive approach may serve a desire to limit robotic device operation, for example, from cleaning near a specific object or area, such as a flower pot, that may be located on the floor.

Generally, it is contemplated herein to provide one or more apparatus or system using such virtual-barrier approach, whereby one or more beacon signal transmitter and one or more robots initially acquire or measure beacon signaling, to connect or otherwise communicate with one another, such that a particular robotic device may synchronize an internal clock with a clock of a particular beacon transmitter. In embodiments, a signal transmitter may communicate a maximum acceptable approach distance set by a user to the particular robotic device. In embodiments, if a robotic device receives a signal from a beacon transmitter, one or more processors or controllers accessible by the robotic device may compute a time difference value, such as between of transmission of a signal, as indicated by a sending transmitter time-stamp, and a time the signal was acquired, as indicated by the receiving robotic device's internal clock. Thus, a time difference ($\Delta t$) may accurately correspond to the distance that a beacon signal traveled between the beacon and the particular robotic device. Accordingly, the robotic device processor and/or controller may calculate if a robotic device is about to traverse a virtual border line and may respond accordingly to permit or to prohibit traversing the virtual border line.

Figure 2:
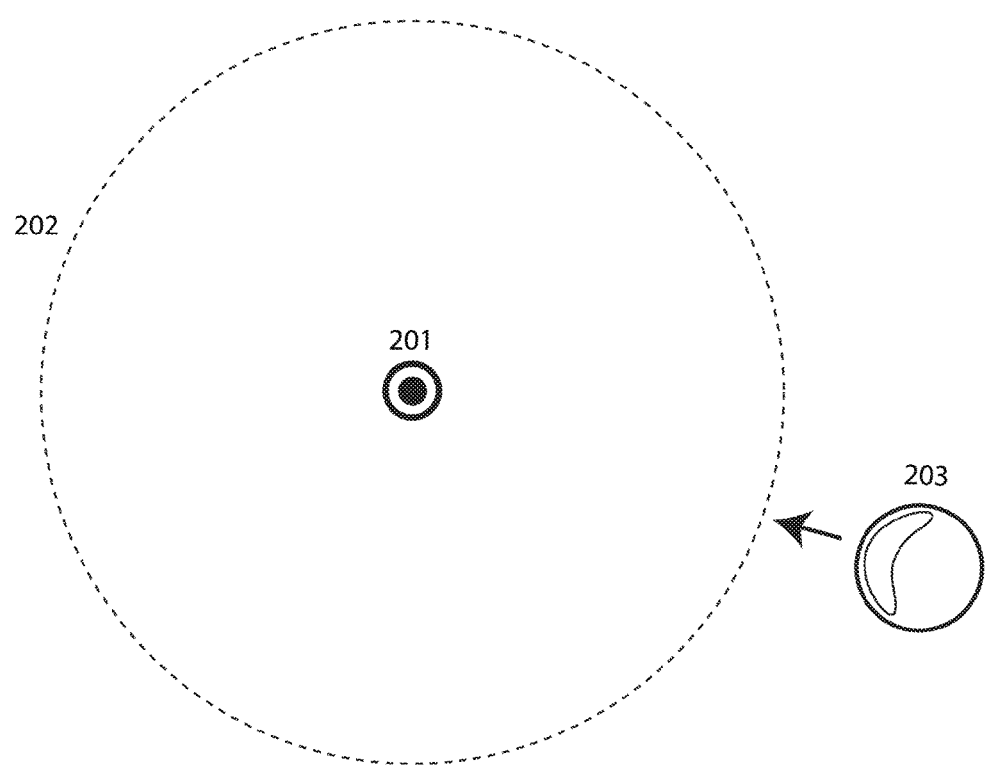
FIG. 2 illustrates a device embodying and/or functionality of an omni-directional virtual barrier beacon creating a barrier outside of which a robotic device remains.

FIG. 2 illustrates a representative device embodying features and/or having the type and functionality of an omni-directional virtual barrier beacon creating a barrier outside of which a robotic device is to remain. As shown in FIG. 2, omni-directional beacon 201 may broadcast signals around an estimated location, such as area 202, and as autonomous robotic device 203 becomes proximate with the signal source, a time difference ($\Delta t$) between transmission of a signal from a source and acquisition of the signal by the robotic device may appear measurably smaller. A maximum acceptable approach distance (or minimum acceptable time difference) can be set by the user on the beacon source equipment. This user-selected approach distance (or minimum acceptable time difference) may be transmitted from the beacon transmitter to the robotic device's processor or controller via sonar, radio, or other wireless technology at or subsequent to initial communication or contact between a beacon and a robotic device. Alternatively, one or more user-selected approach distances and/or minimum acceptable time differences may be communicated between a beacon and a robotic device subsequent to a change in one or more approach distance/time difference parameters. In embodiments, if a robot reaches a pre-defined minimum acceptable time difference, a processor or controller accessed by a robotic device may be configured to initiate a navigation function, for example, in which a robotic device may move away from (or move toward) a direction of decreasing ($\Delta t$).

In one embodiment, one or more signal transmitters may comprise a plurality of beacon signal emitters, so as to provide improved coverage 360 degrees around the transmitter, preferably with increased beacon signal power output level. However, it is contemplated herein that a system having a single signal emitter per transmitter is functional to operate successfully, although signal strength may be weaker throughout the 360-degree area around a single beacon transmitter.

In yet another embodiment, an omni-directional beacon may be used to define boundaries within which one or more autonomous robotic devices may remain. An omni-directional configuration may advantageously maintain robotic device movement internal to (or external to) an area of a workspace that is not divided by walls or other physical barriers. An omni-directional approach may advantageously serve a user preference to prioritize cleaning of certain areas. Accordingly, an omni-directional beacon may be placed near the center of a desired working area, thereby facilitating a user setting of maximum acceptable distance that a robotic device may travel from a beacon transmitter. In yet another embodiment, a minimum distance from the beacon transmitter may be set as well, for example, to prevent accidental collisions between the robotic device and the signal transmitter, which may occur if, for example, the robotic device's other sensors fail to detect the signal transmitter. In an example, if a robotic device and beacon transmitter make initial contact, beacon signaling information may be wirelessly transmitted to the robotic device.

Figure 3:
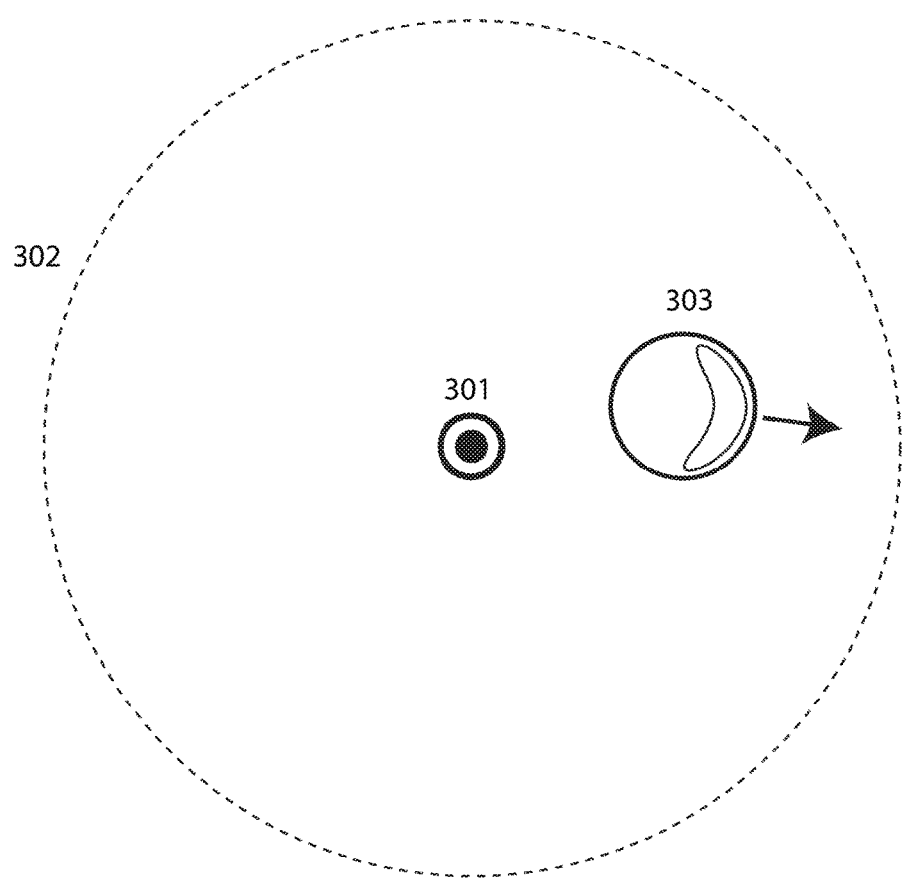
FIG. 3 illustrates a device embodying features and/or functionality of an omni-directional virtual barrier beacon creating a barrier inside of which a robotic device must remain.

FIG. 3 illustrates a device embodying features and/or having the type and functionality of an omni-directional virtual barrier beacon creating a barrier inside of which the robotic device is to remain. As shown in FIG. 3, the omni-directional beacon 301 continually or periodically emits signals omnidirectionally, which may be acquired by robotic device 303. Robotic device 303 may compute a distance from the beacon transmitter in the manner previously described herein, except in this embodiment, the processor or controller may be configured programmably to instruct the processing or control system to stay within a certain ($\Delta t$), depicted as the boundary line 302. Accordingly, for example, as the robotic device travels away from the beacon source of signal emissions, ($\Delta t$) becomes larger, and the processor or controller may instruct a processing or control system to navigate away from areas near which ($\Delta t$) is greater than the predefined maximum, as set by a user. In one embodiment, one or more beacon signal transmitters may comprise multiple signal emitters, so as to provide more thorough coverage spatially around all 360 degrees with stronger communication signals. However, it is contemplated herein that a system with only one signal emitter per transmitter operates effectively, although in such single-transmitter case, signal strength may not be consistent throughout the entire 360-degree area around the transmitter.

In another embodiment, a signal transmitter may be used to create a linear barrier for an autonomous robotic device. In embodiments, a linear barrier may permit blocking off of sections of rooms, or entire rooms, for example, from a mobile robotic device's working area. A linear barrier approach may employ similar time-synchronization and time-stamping approaches described above. However, in a linear barrier approach, a signal transmitter may emit at least two signals, (e.g., signal A and signal B) from two different antenna structures or radiating elements, but spaced variously apart, and/or emitting signal carriers having different frequencies. Although such multi-emitters for variant signals A and B may be housed within the same transmitter, because signals are transmitted from multiple emitters situated at slightly different physical locations and/or differently-located antenna structures, such variant signals may generate detectably different time calculations ($\Delta t$), except when such robotic device is positioned proximate with a location on the centerline of the signal transmitter and thus equidistant from the emitters. Thus the processor and/or controller may be configured to calculate the function "($\Delta t$)a−($\Delta t$)b." Accordingly, if the function (($\Delta t$)a−($\Delta t$)b) returns a result of approximately 0.0 seconds, a robotic device may be spatially situated at the virtual barrier, and hence the processor and/or controller may instruct the processing or control unit to navigate the robotic device away from the virtual barrier.

Figure 4:
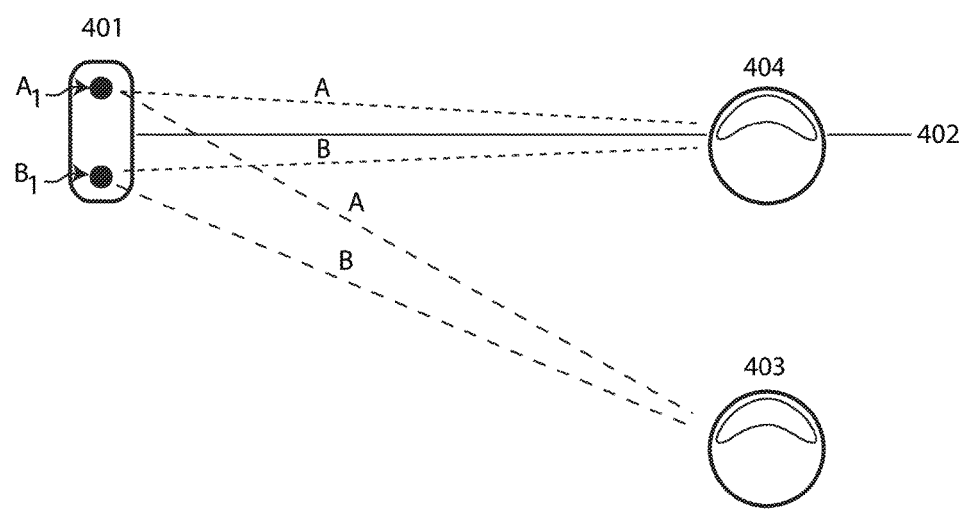
FIG. 4 illustrates a device embodying features and/or having operation of a substantially straight-line, virtual barrier beacon.

FIG. 4 illustrates a sample representative autonomous robotic device embodying features of the present invention and having operation of a straight-line virtual barrier beacon. As shown in FIG. 4, a signal transmitter 401 may utilize two emitters, $A_1$ and $B_1$, for emitting the signals A and B to generate virtual barrier 402 along a certain virtual line. Here, if the beacon signal transmitter synchronizes a clock with a clock of the robotic device, and transmits beacon signals, the ($\Delta t$) of the signals A and B may be measurably different from one another at points for which robotic device 403 is not located equidistant from both emitters, for example, to one side or another of virtual barrier 402. However, if the robotic device 403 is positioned at 404, which may correspond to a location on the centerline of the transmitter 401, because the distance that each signal travels to the robotic device is substantially the same, $\Delta t$ of A and B may be expected to be approximately identical. Accordingly, as programmed in a processor or controller of robotic device 403, if the "($\Delta t$)a−($\Delta t$)b" returns a computed value of approximately 0.0 seconds, the robotic device may identify a virtual barrier that should not be traversed or crossed.

Figure 5:
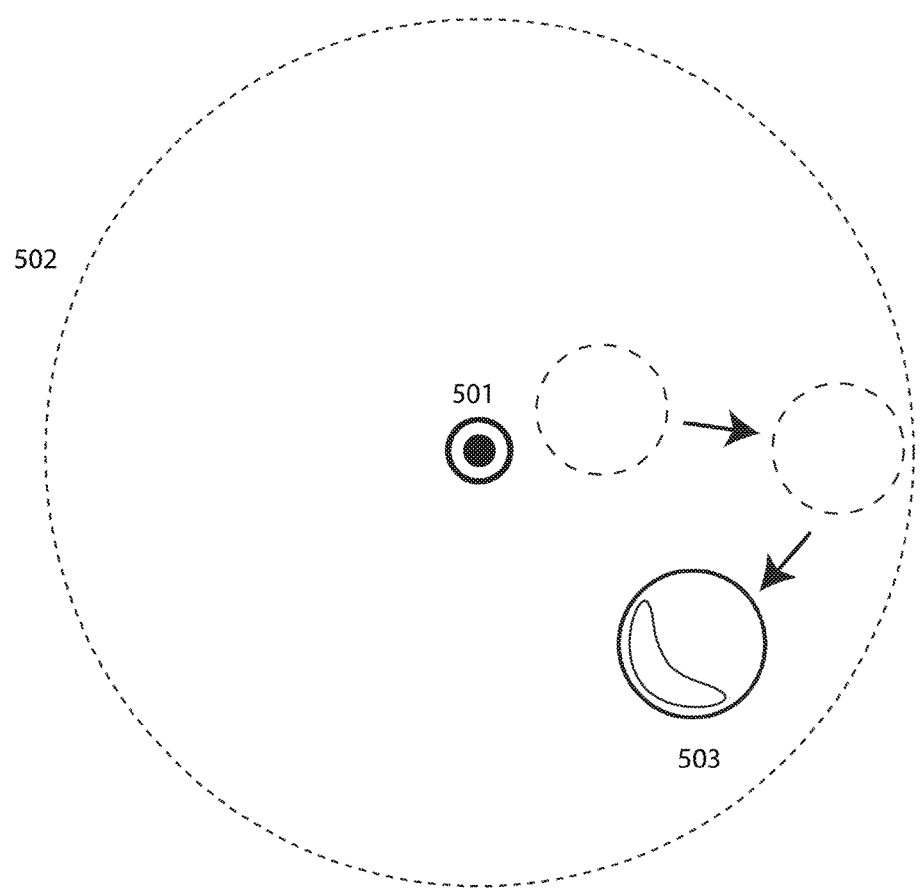
FIG. 5 illustrates a device embodying features in which a robotic device may be confined to an area inside of an omni-directional virtual barrier.

FIG. 5 illustrates another example representative autonomous robotic device embodying features of a robotic device confined inside of an omni-directional virtual barrier. FIG. 5 shows a robotic device 503 as confined within the virtual barrier 502, which is computed utilizing signals emitted from beacon emitter 501. If a time difference between initiation of the transmitted signal from the beacon source and acquisition of the transmitted signal by robotic device ($\Delta t$) reaches a user-defined maximum 502, the robotic device may be instructed to turn away, thus remaining within the enclosed space.

Figure 6:
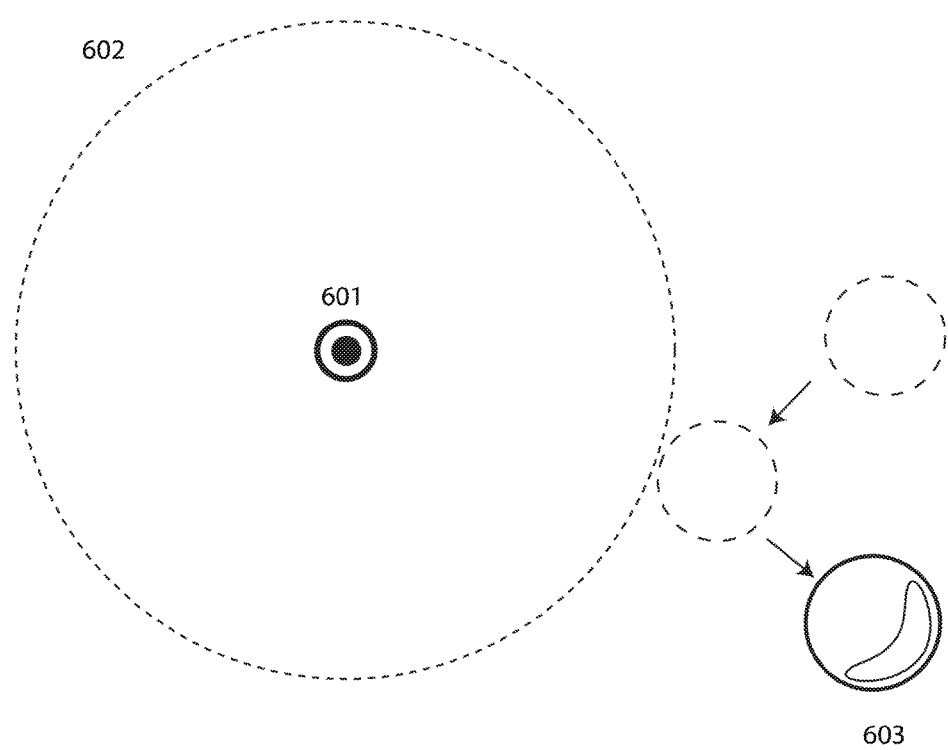
FIG. 6 illustrates a device embodying features in which a robotic device may be prohibited from entering an area within an omni-directional virtual barrier.

FIG. 6 illustrates another representative sample autonomous robotic device embodying features of a robotic device being prohibited from entering within an omni-directional virtual barrier. In FIG. 6, a barrier 602 may be generated utilizing signals emitted by beacon emitter 601, outside of which robotic device 603 must remain. In this omni-directional embodiment, if the time difference between transmission of a signal from the beacon source and acquisition of the transmitted signal by the corresponding robotic device ($\Delta t$) reaches a user-defined minimum, a robotic device may be configured (such as programmably configured) to turn away, thus maintaining a desired minimum radial distance from the beacon emitter.

Figure 7:
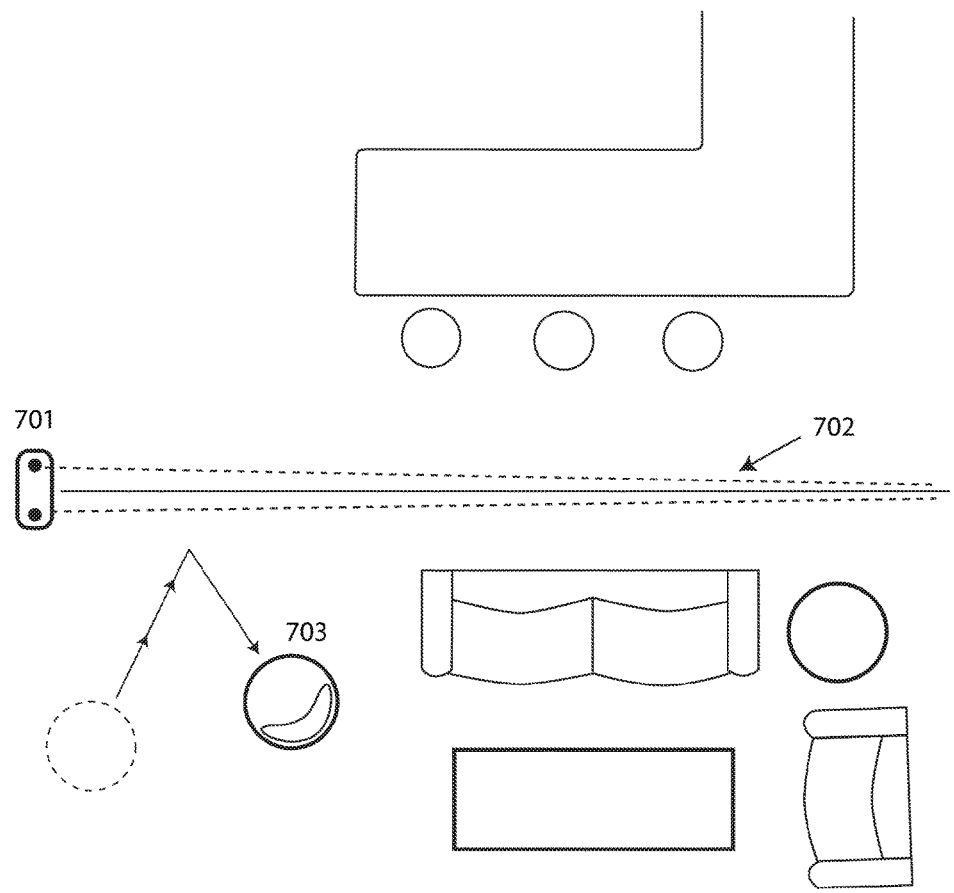
FIG. 7 illustrates a device embodying features wherein a substantially straight-line virtual barrier may be used to keep a robotic device from entering a portion of a room.

FIG. 7 illustrates yet another representative sample autonomous robotic device embodying features and having a straight-line virtual barrier for keeping a robotic device from entering a portion of a room. FIG. 7 illustrates a straight-line barrier 702 emitted by the beacon emitter 701 to contain the robotic device 703 within one or more portion of a room. Thus, for example, if a difference between time lapses ($\Delta t$) from two emitted beacon signals approaches approximately 0.0 seconds, the robotic device may be configured programmably to turn away, thus remaining to one side or the other of the virtual barrier.

Figure 8:
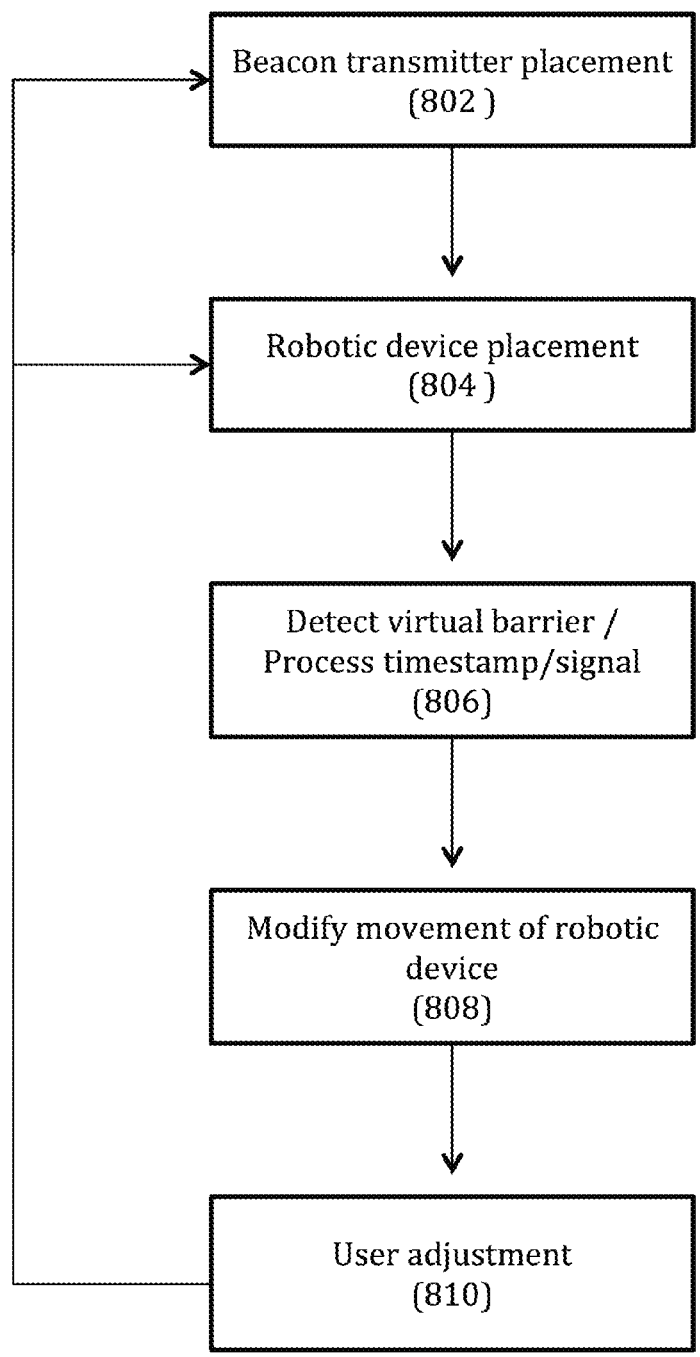
FIG. 8 illustrates a representative flow chart generally including a process flow of robotic operations or computer-executed method actions according to one or more embodiments.

FIG. 8 illustrates a representative flow chart generally including a process flow of robotic operations or computer-implement method blocks 802, 804, 806, 808, 810, according to an embodiment.

Initially, in one or more embodiments as contemplated herein, one or more beacon transmitter units or devices may be placed (802) for wireless signal transmission as contemplated herein to control one or more autonomous robotic device movements within or outside of certain areas designated by a user. Also, one or more autonomous robotic devices may be placed (804) in spatial signaling proximity and cooperation wirelessly with one or more beacon units.

Then, as contemplated for one or more embodiments described herein, one or more processors or controllers may execute one or more software applications, and/or access one or more local or networked databases to bring about robotic device movement to restrict, permit, or otherwise change a robotic device's movement path in response to a created virtual barrier. In particular, processing 806 one or more time-stamped signals may generate, form, or otherwise determine one or more virtual (e.g., omni-directional, linear, etc.) barriers.

Thus, as contemplated for one or more embodiments described herein, a processor or controller may determine or otherwise calculate one or more distances between the robotic device and the beacon transmitter by measuring elapsed times ($\Delta t$) between transmission of time-stamped signals from the transmitter and their acquisition by the robotic device. Calculation may permit changing, restricting, permitting, or other modification to movement of a robotic device as programmed (808) and/or user adjustment (810).

For example, as contemplated for one or more embodiments described herein, a processor or controller may bring about robotic device movement away from (or toward) a location associated with calculated time-elapsed values, such as a predefined minimum or maximum $\Delta t$, depending at least in part, for example, on whether robotic movement restriction or permission is desired. Accordingly, predefined or adjusted minimum or maximum $\Delta t$ or determined distance between a particular robotic device and corresponding beacon transmitter may be used, and communicated between beacon transmitter(s) and robotic device(s,) such that the minimum or maximum $\Delta t$ may serve to effectively restrict or permit autonomous robotic device movement relative to one or more virtual barriers associated with one or more beacon transmitters. Alternatively, if one or more beacon transmitters emits multiple variant beacon signals, e.g., at different frequencies or from different emitters, for example, corresponding robotic device(s) may calculate elapsed time $\Delta t$ variance based on the detected beacon signal. Calculation of elapsed time may control a corresponding robotic device(s) so as to recognize one or more virtual, circular, linear, or other spatial barrier to prohibit or permit robotic movement thereto.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching. The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

That which is claimed:

1. A method for restrictively limiting movement of a robotic device from crossing a virtual line, via one or more processors, comprising:
synchronizing a beacon clock with a robotic device clock;
transmitting clocked beacon signals by paired emitters of a beacon;
receiving the clocked beacon signals by the robotic device;
comparing the received clocked beacon signals by the robotic device;
responsive to determining that the received clocked beacon signals are equal, stopping the robotic device from crossing the virtual line, thereby restrictively enabling movement of the robotic device to within a linear virtual barrier corresponding with a centerline of the paired emitters.

2. The method of claim 1, wherein the one or more processors executes computer-implemented instructions to restrict or modify a movement path of the robotic device in response to approaching the virtual line.

3. The method of claim 1, further comprising:
the one or more processors determining distance between the robotic device and the paired emitters of the beacon by computing, via the one or more processors, one or more values of elapsed time between a transmission time of one or more time-stamped signals transmitted by the paired emitters of the beacon and a time at which the one or more time-stamped signals were acquired at the robotic device.

4. The method of claim 3, further comprising:
the robotic device moving in a direction away from one or more points estimated, at least in part, by computing the one or more values of elapsed time.

5. The method of claim 3, wherein the one or more values of elapsed time corresponds to an estimated distance between the robotic device and the beacon, the estimated distance to be user-adjustable.

6. The method of claim 1, further comprising:
the paired emitters of the beacon transmitting clocked beacon signals having carrier frequencies that differ from one another.

7. The method of claim 6, further comprising:
responsive to detecting a plurality of the signals having carrier frequencies that differ from one another, the robotic device comparing a computed value of elapsed time, between a transmission time of one or more time-stamped signals transmitted by the paired emitters of the beacon and a time at which the one or more time-stamped signals were acquired at the robotic device, for corresponding ones of signals having carrier frequencies so as to compute a difference value between calculated elapsed time for the corresponding ones of signals having carrier frequencies, the one or more processors configuring, responsive to the comparing, the robotic device to avoid traversing the virtual line, the virtual line determined, at least in part, by utilizing the computed value of elapsed time of the ones of the signals having different carrier frequencies.

8. The method of claim 1, further comprising:
restrictively enabling movement of the robotic device across the virtual line based at least in part-on omni-directional transmission of signals of different frequencies.

9. The method of claim 1, wherein the receiving further comprises acquiring a sonar signal at the robotic device.

10. The method of claim 1, wherein the receiving further comprises acquiring a radiofrequency signal, a laser signal, an infrared signal, or any combination thereof.

11. A system for generating a virtual barrier to restrict movement of a robotic device from crossing a virtual line, comprising:
a receiver coupled with the robotic device to acquire one or more time-stamped signals transmitted by paired emitters of a beacon; and
one or more processors to determine a distance of the robotic device to the paired emitters of the beacon based, at least in part, on the one or more acquired time-stamped signals,
the one or more processors to restrict movement of the robotic device across the virtual line, corresponding with a centerline of the paired emitters.

12. The system of claim 11, wherein the one or more processors executes computer-implemented instructions to bring about restricting or modifying the movement of the robotic device responsive to encountering the virtual line.

13. The system of claim 11, the robotic device further comprises:
a chassis including a set of wheels;
at least one motor to drive the wheels; and
at least one clock.

* * * * *